Patented May 7, 1940

2,199,841

UNITED STATES PATENT OFFICE 2,199,841

METHOD OF TREATING HYDROCARBON MIXTURES

Gabriel E. Rohmer Saleh, New York, N. Y., assignor of one-tenth to Carl P. Goepel, New York, N. Y.

No Drawing. Application May 21, 1935, Serial No. 22,561

2 Claims. (Cl. 196—79)

This invention relates to a method of treating hydrocarbon mixtures and residua containing colloidally dispersed carbon to recover valuable constituents present therein.

In the industrial arts there are a large number of hydro-carbon mixtures and residua which have substantially the status of waste products. Many of these residua contain valuable constituents which go to waste for the reason that no convenient method is known for effectively recovering the same. Many of these products contain a quantity of free amorphous carbon in suspended or colloidal state. This carbon may be of asphaltic nature or it may occur mixed with resinous materials. Commercially feasible methods for the separation of this carbon from the valuable constituents in which it is suspended have been lacking or lack practical application. The materials to which reference is made may be residua from the distillation, cracking or refining of crude petroleum oils, various petroleum sludges, coal tars, coke oven tars, wood tars, residua from destructive hydrogenation processes, pitches of various sorts, dry bitumens, asphaltic materials, and constituents of shale and lignite.

I have found that colloidal hydrocarbon mixtures and residua, such as those mentioned, are susceptible of being separated into their valuable constituents by the extremely simple method of mixing them with a small amount of finely divided absorbent carbon material, preferably an amount substantially equal to the quantity of fixed carbon present in the hydrocarbon mixture, and subjecting the resulting magma to a heat treatment and then distilling off the volatile products which can be thus readily separated from the remaining carbon. The initial carbon in such mixtures seems to lock the volatile products to prevent their removal by present methods of treatment. The joining of such initial carbon with the added carbon in accordance with the method of the present invention results in unlocking such volatile products.

I have found that various carbon materials can be used in my process. While substantially pure carbon is more effective than impure products, I have found that good results are produced with charcoal. Carbon black produces better results and the so-called "activated" or "absorptive" carbons are the best materials which I have used, although these are somewhat expensive for general commercial use. I have also used gas black, lamp black, etc. Any type of absorptive and clean carbon appears satisfactory in my process.

The heat treatment of my process can be conducted under atmospheric or higher pressures. When atmospheric pressure is employed most of the volatile products distill off during the heat treatment, especially if this is carried out at increasingly higher temperatures.

One method which can be effectively employed in my invention is to introduce the residua-carbon mixture into a batch pressure but air tight still, whereby the operation is carried out under the exclusion of atmospheric air to the still. This still may be fired until the temperature rises within the range of about 60° to 500° C. After heating the still in this manner a distillate may be withdrawn until no more volatile contents remain in the batch, the material in the still being then reduced to coke.

In carrying out my process, I have mixed, for example: 880 kilograms of amorphous residuum left over after several refining operations of an asphaltic crude oil, such residuums having a specific gravity of 1.090, with 120 kilograms of ground up charcoal. When this mixture was submitted to a series of heat ranges in an air-tight retort at temperatures ranging from 60° to 500° C., the yield obtained was as follows:

| | Per cent |
|---|---|
| Gas oil and other high volatile fractions | 84 |
| Fixed carbon | 13 |
| Losses in gases | 3 |

It is almost impossible to predetermine the correct percentage of the clean carbon reactive agent to be added to any given mass of residuum, and it is necessary to take such residuum and subject it to a proper test with added or subtracted clean carbon to ascertain the proportions necessary to create the reaction, in view of the fact that residua obtained from different places differ from each other. Numerous tests I have made indicate that at least 10% of clean carbon (by weight) must be added to the bulk of the residuum, to obtain the desired reaction.

I have also found that the reaction can be activated by adding a small percentage of nitrate alkaline salts to the carbon reagent before mixing; the proportion of this alkaline nitrate averaging about 10% by weight of the clean carbon.

The time required for the heat treatment depends to a certain extent upon the nature of the residuum and the amount of free or fixed carbon contained therein. Residua having larger proportions of suspended carbon usually require longer time of heat treatment. With the residua which I have tested the optimum periods for heat treatment have varied from about 70 to 180 minutes. A series of heat treatments may be employed at increasing temperatures if desired. The yield of distillate recovered in actual operation has varied from about 40 to 95 per cent by volume of the mass of residuum. This is a considerably larger recovery of the valuable constituents than is possible by any other method known by me.

I usually conduct the distillation step of my process to the point where a substantially dry coke remains. I have found that this coke may be ground and used as the carbon addition in the first step of the process. For certain residua it is usually advantageous to admix a small amount of fresh carbon to this coke, however, since otherwise the absorbent properties are found to gradually decrease. The coke obtained in my process may, of course, be employed as a fuel or for other purposes for which its absorbent properties may adapt it since it is very dry.

When it is desirable to obtain a high grade of blast furnace coke by the treatment of coal tar pitch, a greater percentage of carbon is desirably added to the batch, and the heat treatment of the mass is preferably terminated sooner in order to keep the desired amount of volatile materials and of B. t. u. values in the residuum coke.

Slight modifications will be readily apparent to those skilled in this art in order to perhaps obtain greater yields by different applications of the basic principle of this invention. While I have outlined what I consider to be the best embodiments of my invention, it is obvious that many modifications may be made therein without departing from the purview of my invention and the scope of the following claims.

I claim:

1. In the art of re-generating residua, emulsions, or other forms of colloidal hydro-carbon mixtures containing carbon, that step consisting in forming an hydro-carbon magma by mixing a colloidal hydro-carbon mixture containing carbon with added and substantially clean and finely divided ground-up charcoal in proportion substantially equal to the amount of fixed carbon contained in said colloidal hydro-carbon mixture, adding a small percentage of a nitrate alkaline salt as an activating agent to the carbon re-agent before mixing, in submitting the resultant magma and activating agent, enclosed in an air-tight vessel, to temperature ranges not exceeding 500° C., in recovering the resultant light hydro-carbon distillates and in leaving a coke residue.

2. Method of treating and re-generating hydro-carbon colloidal mixtures, residua, emulsions, or other forms of colloidal hydro-carbon mixtures containing fixed carbon, which consist in subjecting to temperatures not exceeding 500° C. in an air-tight vessel, a magma of a colloidal hydro-carbon mixture containing fixed carbon with added and substantially clean and finely divided ground-up carbon in proportion substantially equal to the amount of said fixed carbon in the presence of a nitrate alkaline salt, as an activating agent, and freeing under the action of said heat upon said magma the resultant light hydro-carbon distillates leaving a coke residue.

G. E. ROHMER SALEH.